United States Patent [19]

DiIanni

[11] 3,870,175

[45] Mar. 11, 1975

[54] DECAPPING OF BOTTLES AND DECANTING THE LIQUID CONTENTS THEREOF

[75] Inventor: Daniel DiIanni, Toronto, Ontario, Canada

[73] Assignee: Carling O'Keefe Limited, Toronto, Ontario, Canada

[22] Filed: May 6, 1974

[21] Appl. No.: 467,013

[52] U.S. Cl.................... 214/304, 81/3.2, 214/310, 222/398
[51] Int. Cl........................................... B65d 81/32
[58] Field of Search ........... 214/304, 305, 309, 310; 81/3.2; 222/373, 398

[56] References Cited
UNITED STATES PATENTS

| 1,445,643 | 2/1923 | Peron................................ 222/398 |
| 1,460,208 | 6/1923 | Mohn................................. 222/398 |
| 2,386,152 | 10/1945 | Wahl................................. 214/304 |
| 2,612,065 | 9/1952 | Packer et al....................... 214/304 |
| 2,860,796 | 11/1958 | Holstein............................ 214/310 |

Primary Examiner—Robert J. Spar
Assistant Examiner—Lawrence J. Oresky
Attorney, Agent, or Firm—Sim & McBurney

[57] ABSTRACT

A mechanical system for the simultaneous decapping of multiple quantities of beer bottles and the subsequent decanting of beer simultaneously from the multiple quantity of decapped bottles is provided. Manual handling of single beer bottles and the production of large and unmanageable quantities of foam (and exposure of the beer to air) is avoided.

14 Claims, 8 Drawing Figures

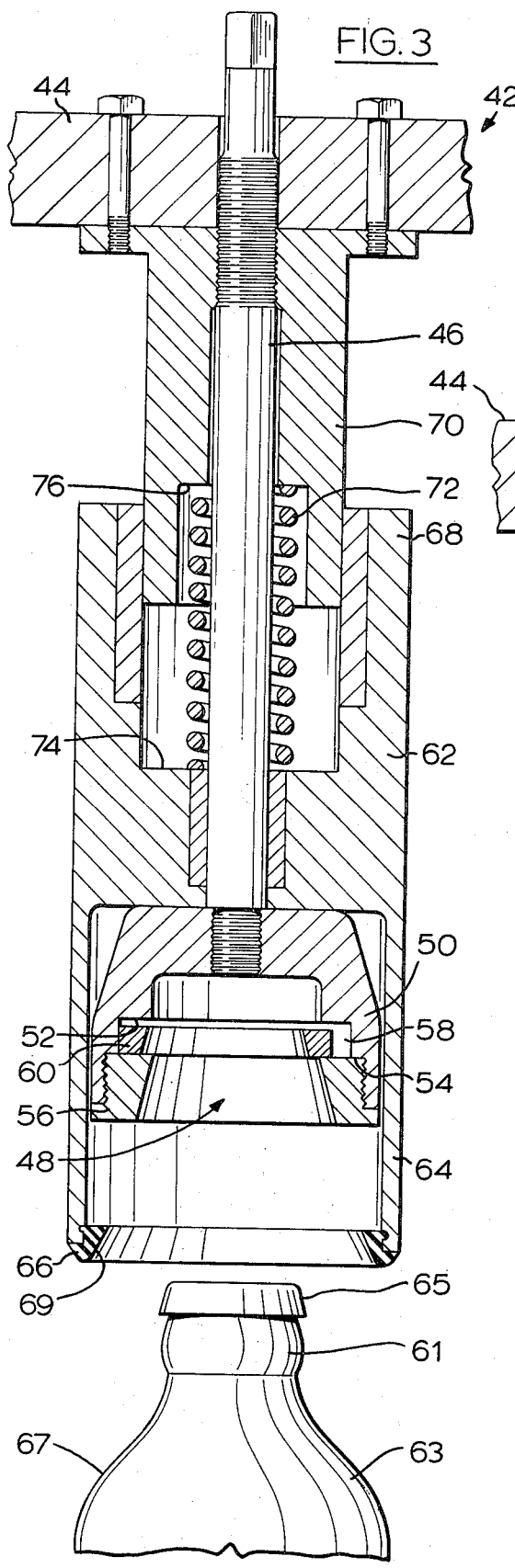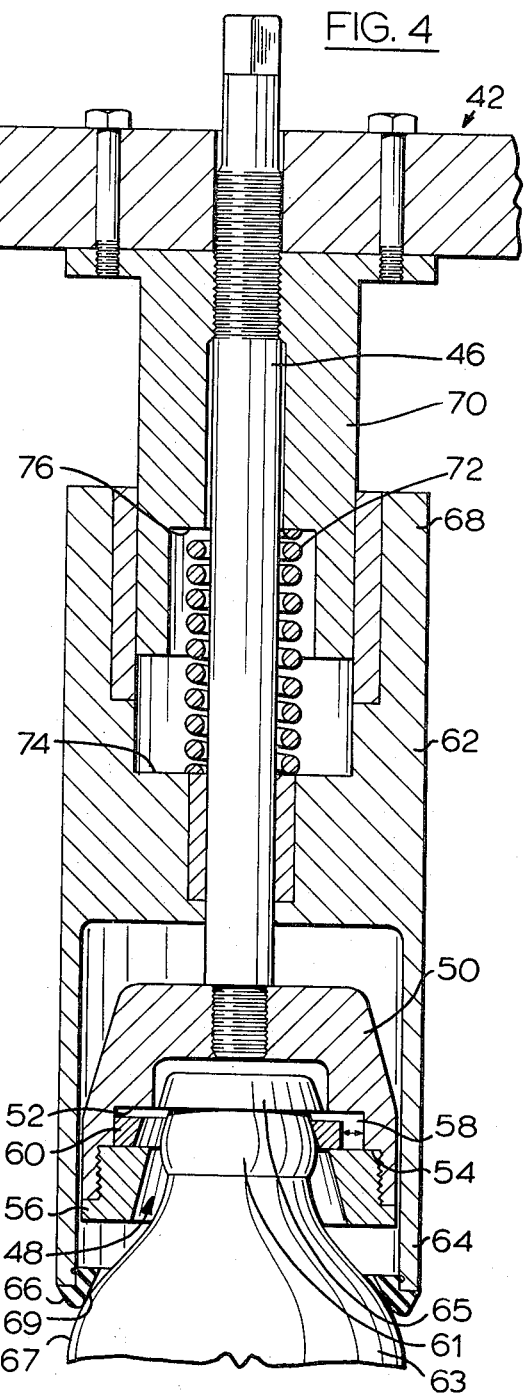

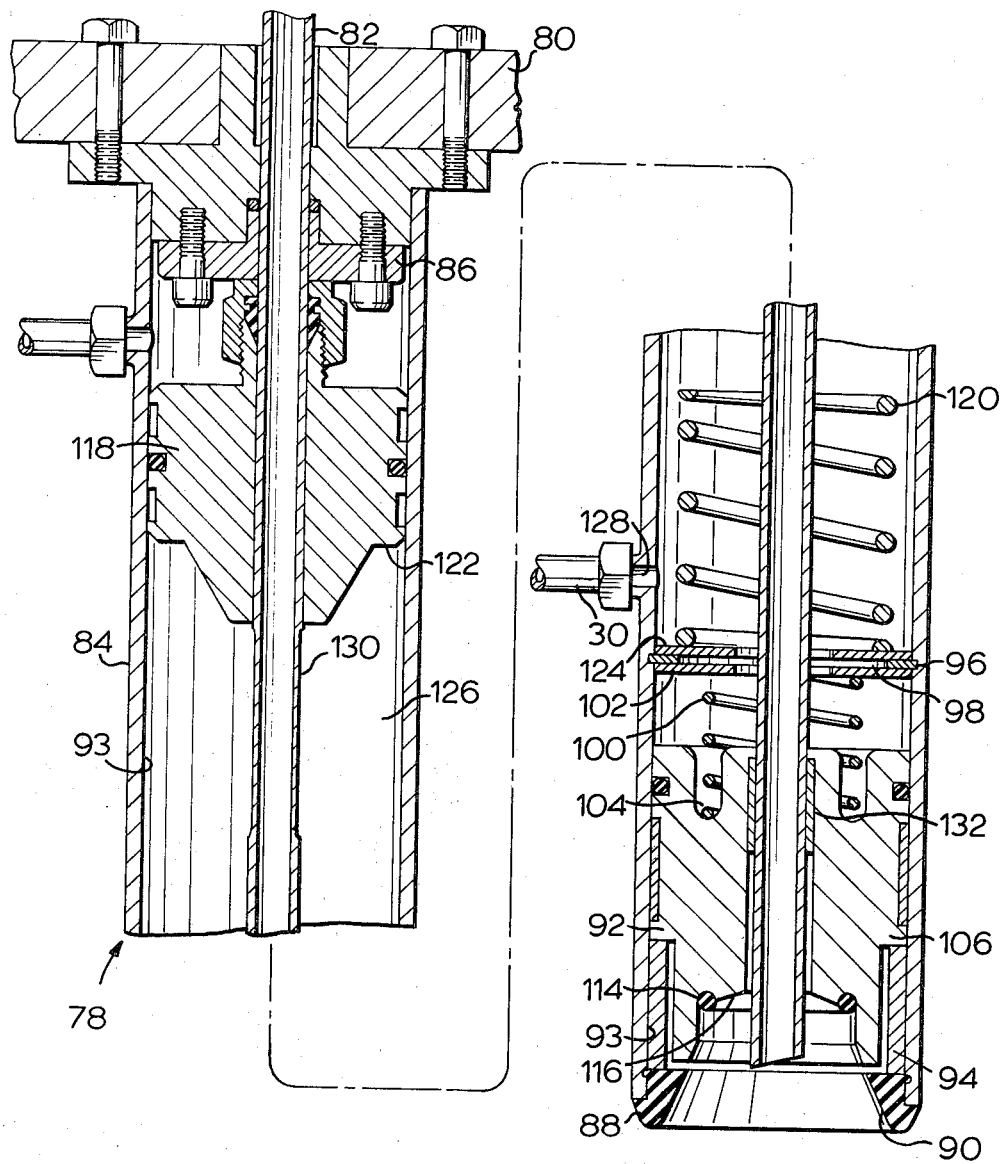
FIG. 6
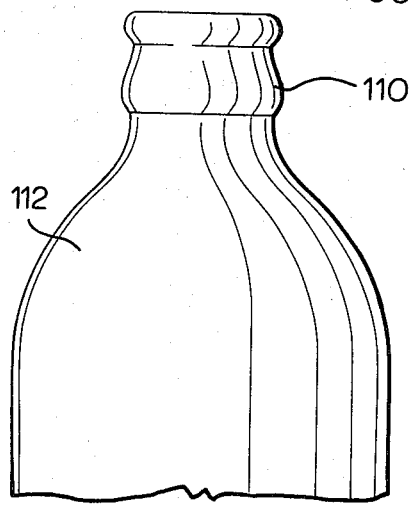

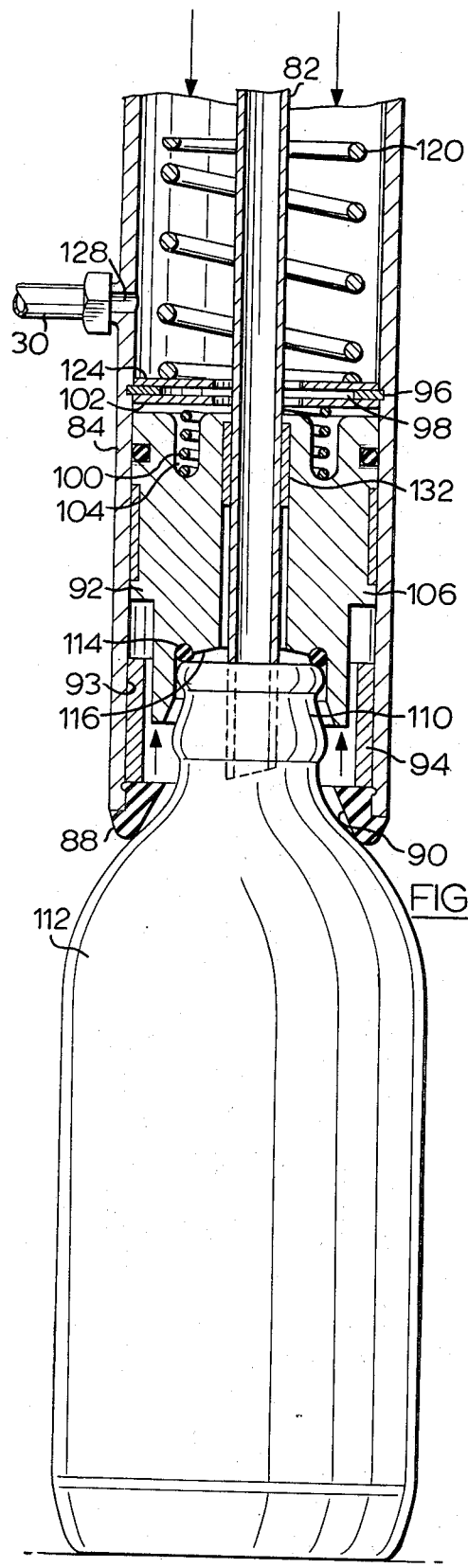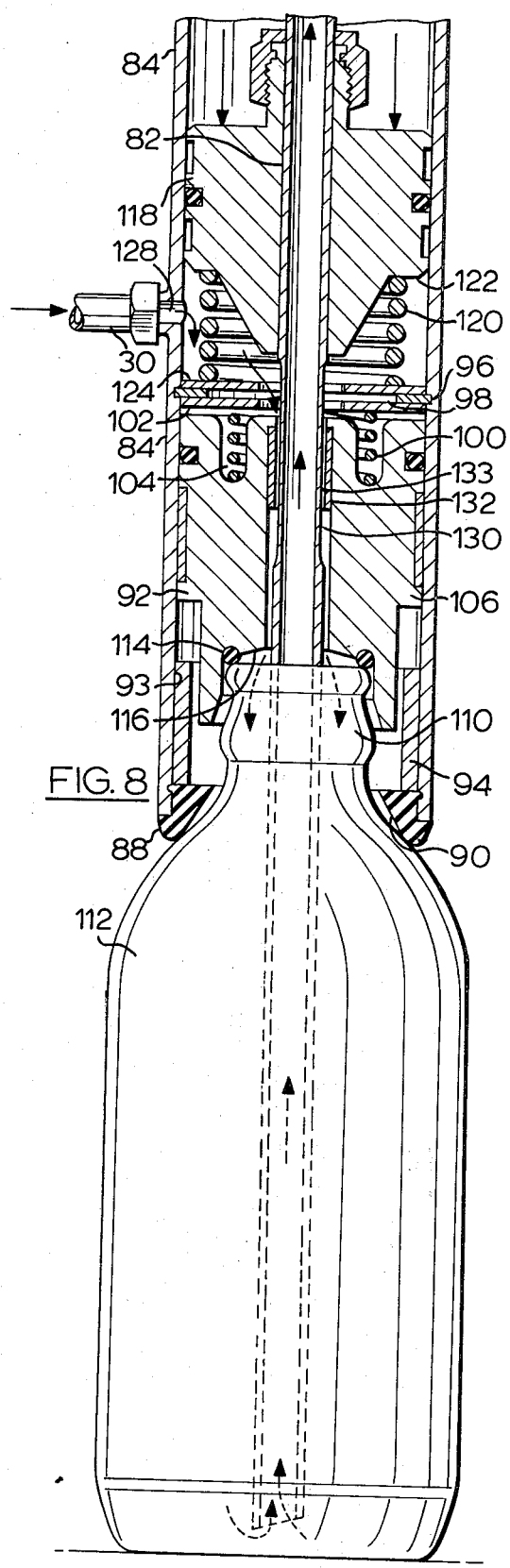

DECAPPING OF BOTTLES AND DECANTING THE LIQUID CONTENTS THEREOF

FIELD OF THE INVENTION

The present invention is directed to the decapping of beer bottles and the decanting of beer from the bottles.

BACKGROUND TO THE INVENTION

In Canada, beer is sold mainly in bottled form, usually in cases containing six, 12 or 24 bottles. In addition to brand markings on the case, each individual bottle also has a brand-identifying label thereon. The bottles are labelled in the beer bottling plant when the bottles are full of beer and the bottles have been capped. The labelled bottles then are packed in the cases for shipping to the retail outlet.

While the labelling procedure generally is efficient in providing uniformly-applied labels, sometimes errors occur and some bottles are mislabelled. Such mislabelled bottles as far as possible are rejected from those packed in cases due to their non-uniform appearance.

The rejected bottles contain beer which then is wasted. However, in Canada, excise tax is levied on beer as soon as it is brewed and in order to obtain a refund for unsold beer, such as that arising through mislabelling, the collection of beer from rejected bottles for recycling is an important economic consideration.

Traditionally, the beer has been collected from the rejected bottles by manual procedures, in which the cap first is removed from a bottle and then the beer is decanted into a collecting vat. Not only is this procedure time-consuming, in that one person can only decap one bottle at a time, but also results in the production of considerable quantities of foam in the collecting vat, arising from the pouring of the beer from a height into liquid in the vat. The foam gives rise to handling problems and difficulties in determining, in other than very rough manner, the quantity of beer which has been collected in the vat. Further, the beer is unnecessarily exposed to air in the decanting procedure, resulting in possible spoilage of the beer rendering it unsuitable for recycling.

SUMMARY OF INVENTION

The present invention provides an efficient mechanical system for simultaneous decapping multiple numbers of beer bottles followed by simultaneous decanting of beer from the opened bottles while the bottles are maintained in their usual packaging environment, typically a tray or case. Production of large quantities of foam and unnecessary exposure of the beer to air is avoided.

BRIEF DESCRIPTION OF DRAWINGS

FIG. 3 is a sectional view taken on line 3—3 of FIG. 2 of one decapping device used in the decapping unit of FIG. 2 in a first position;

FIG. 4 is the sectional view of FIG. 3 with the decapping device in a second position;

FIG. 6 is a sectional view, taken on line 6—6 of FIG. 5, of one decanting device used in the decanting unit of FIG. 5 in a first position;

FIG. 7 is the sectional view of FIG. 6 with the decanting device in a second position; and FIG. 8 is the sectional view of FIG. 6 with the decanting device in a third position.

DESCRIPTION OF PREFERRED EMBODIMENTS

Figure 1:
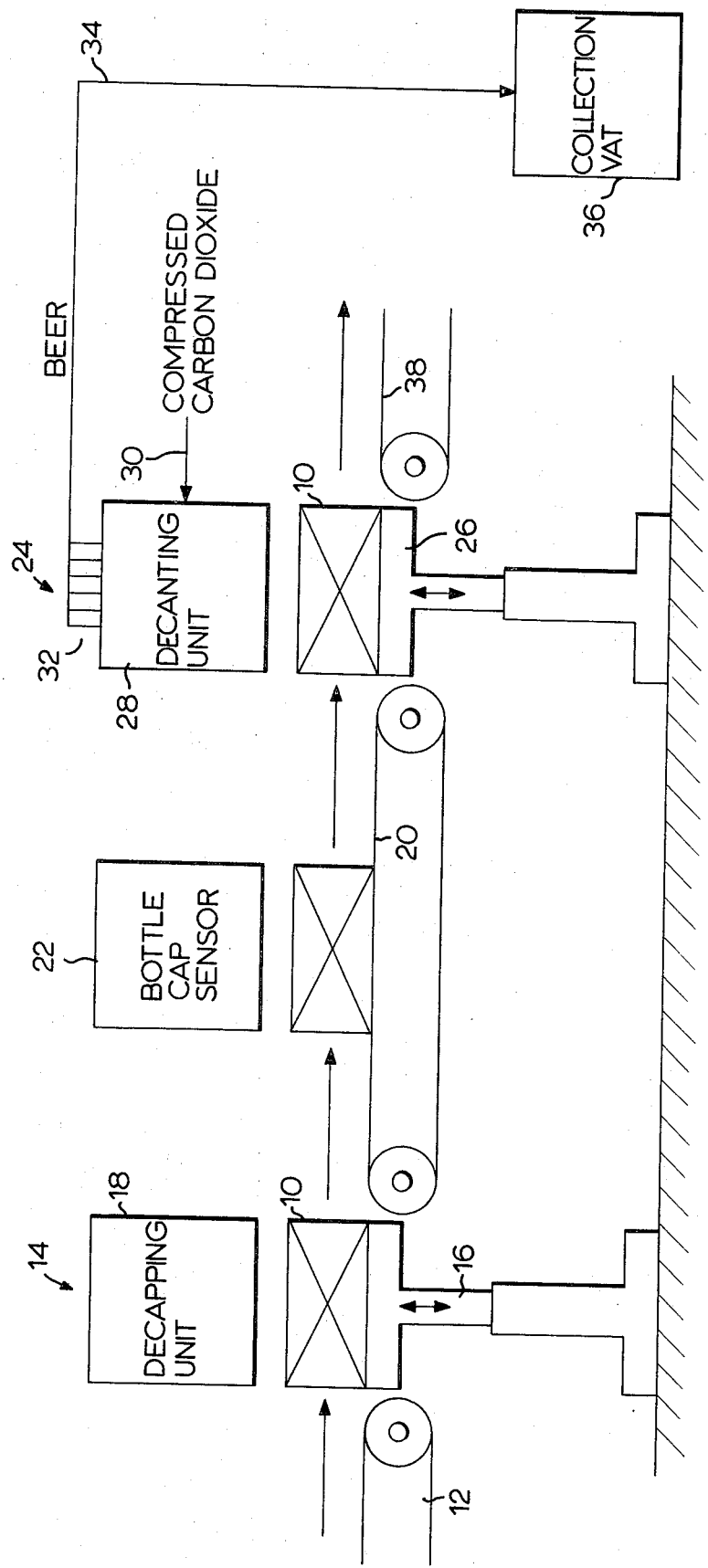
FIG. 1 is a schematic representation of the decapping and decanting procedure in accordance with one embodiment of the present invention.

Referring first to FIG. 1, there is shown in schematic form a decapping and decanting procedure for bottled beer. A beer case 10 is conveyed by any convenient conveyor system 12 to a decapping station 14 which includes an elevating platform 16, actuatable in any convenient manner, such as pneumatically or hydraulically, for reciprocating a beer case 10 positioned thereon in a vertical direction. The decapping station 14 also includes a decapping unit 18, described in more detail below with reference to FIGS. 2 to 4, which is positioned in a substantially fixed location vertically above the elevating platform 16.

A case 10 of beer bottles positioned on the elevating platform 16 is elevated to engage the decapping unit 18 to remove simultaneously the caps from the bottles in the case 10. The procedure may be adapted to operate with 6, 12 or 24 bottle cases, as desired. The elevating platform 16 returns to its original position and the case 10 in which the bottles are now decapped is passed to a conveyor 20 of any convenient form which conveys the case 10 past a bottle cap sensor 22 to a decanting station 24. The bottle cap sensor 22 may be of any suitable construction to ensure that all the caps have been removed from the beer bottles prior to passage of the case 10 to the decanting station 24. The bottle cap sensor may be of any conventional construction known in the art, therefore the details need not be given here. The sensor 22 may be omitted, if desired, however, it usually is present in order to avoid damage to the apparatus should a cap accidentally remain on a bottle.

The decanting station 24 includes an elevating platform 26, actuatable in any convenient manner, such as pneumatically or hydraulically, for reciprocating the beer case 10 positioned thereon in a vertical direction. The decanting station 24 also includes a decanting unit 28, described in more detail below with reference to FIGS. 5 to 8. The decanting unit 28 is positioned in a substantially fixed location vertically above the elevating platform 26.

A case 10 of decapped beer bottles positioned on the elevating platform 26 is elevated to a position in which the decanting unit operatively engages the bottles. Compressed carbon dioxide, or any other suitable inert fluid, from a suitable source thereof, is fed by line 30 to the decanting unit 28 to force beer out of all the bottles in the case 10 simultaneously, the displaced beer passing out of the decanting unit 28 by lines 32 which are joined to a common beer drain line 34. The beer passes by the drain line 34 to a collection vat 36.

Following displacement or decanting of the beer from the bottles, the platform 26 returns to its original position and the case 10, now containing empty beer bottles, is discharged to a conveyor belt 38 of any convenient construction. The case of empty bottles is conveyed by the belt 38 to any desired location.

The decapping and decanting procedure rapidly and effectively decaps a plurality of bottles simultaneously and decants the beer from the decapped bottles simultaneously into a collection vat in a manner whereby production of foam may be minimized. The procedure of this invention, therefore, represents a considerable improvement over the manual prior art procedures.

Figure 2:
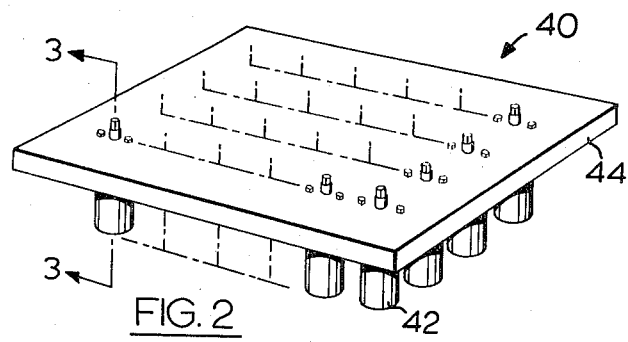
FIG. 2 is a schematic perspective view of the decapping unit used in the embodiment of FIG. 1.
Figure 5:
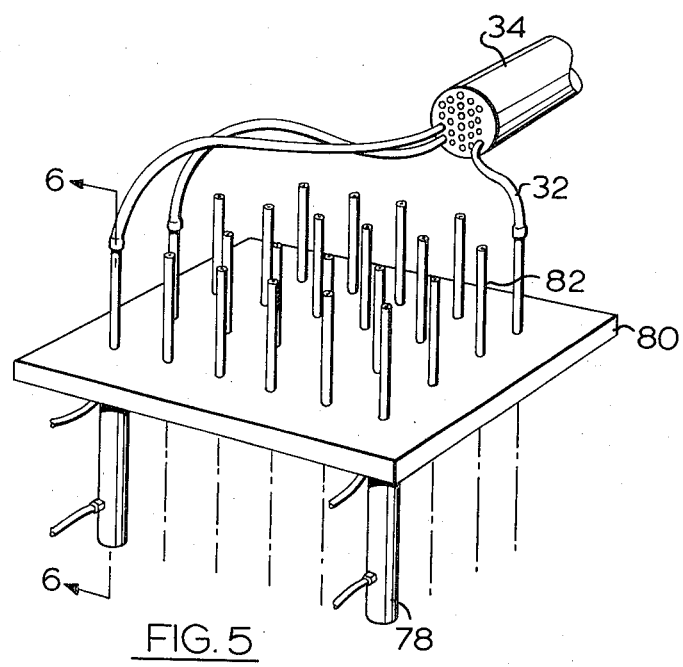
FIG. 5 is a perspective view of the decanting unit used in the embodiment of FIG. 1.

Turning now to consideration of FIGS. 2 to 4, wherein there is shown in more detail a decapping unit utilizable at the decapping station 14 of FIG. 1, a decapping unit 40 includes a plurality of decapping elements 42, corresponding in number to the maximum number of bottles which is holdable in the beer case 10, typically 24 as illustrated, so that each decapping element 42 removes a top from one bottle in the case 10. The decapping elements 42 are mounted on a mounting plate 44 of any convenient construction and the mounting plate 44 is held in a fixed location in any conventional manner.

Each decapping element 42 includes a central rod member 46 mounted in a substantially fixed position and which has a decapping member 48 mounted on the lower end thereof. The decapping member 48 includes a cup element 50 having annular shoulders 52 and 54 formed in the inner wall thereof. An annular ring member 56 is fixedly mounted in the mouth of the cup element 50 in engagement with the shoulder 54. The fixed ring member 56 defines with the shoulder 52 an annular cavity 58. In the annular cavity 58 is situated a movable ring member 60 of outer diameter less than the outer diameter of the cavity 58 but greater than the inside diameter of the ring member 56. The movable ring member 60 is resiliently mounted for biasing towards and into engagement with the side wall of the cavity 58.

The resiliently-displaceable ring member 60 includes a lip which is capable of engaging the underside of a crown cap to remove the same during operation of the decapping element 42.

The fixed ring member 56 has an inside diameter which is large enough to enable the neck 61 of a beer bottle 63 to pass therethrough. The resiliently-displaceable ring member 60 normally is biased to a position in which a portion of its periphery is located in the orifice of the fixed ring member 56, as illustrated in FIG. 3. The resiliently-displaceable ring member 60 has an inside diameter allowing the crown top 65 and adjacent area of the neck 61 of the beer bottle 63 to pass therethrough.

An outer cylindrical member 62 is coaxially mounted in sliding relation on the rod 46 adjacent the decapping member 48. The sleeve 62 includes an integral downwardly-extending skirt portion 64 which surrounds and encloses the decapping member 48. The mouth of the skirt portion 64 has a diameter substantially that of the shoulder 67 of the bottle 61 and includes an annular ring 66 of any suitable material having an inclined beer bottle shoulder-engaging surface 69.

The outer cylindrical sleeve 62 also includes an upwardly-extending skirt portion 68 which is situated in sliding telescoping relation with a cylindrical element 70 joined to the mounting plate 44 coaxially of the rod 46. A compression spring 72 is situated between opposed surfaces 74 and 76 of the cylindrical elements 62 and 70 respectively and normally biases the cylindrical element 62 downwardly away from the plate 44. The lower extremity of movement of the cylindrical element 62 is defined by the fixed location of the decapping member 48 and the upper extremity by the position of abutment of the surfaces 74 and 77 of the elements 62 and 70 respectively.

The decapping element 42 operates by insertion of the neck 61 of a beer bottle 63 substantially centrally in the mouth of the skirt portion 64. As the bottle 63 rises, under the influence of the elevating platform 16, the shoulder engaging surface 69 engages the shoulder 67 of the beer bottle. As the bottle 63 continues to rise, this engagement causes the sleeve 62 to move upwardly against the action of the spring 72 and the crown cap 65 enters the orifice of the fixed ring member 56 and engages the projecting portion of the resiliently-displaceable ring member 60. Continued upward movement of the bottle 63 causes the crown cap 65 to displace laterally the ring member 60 until the cap 65 has passed upwardly beyond the ring member 60 allowing the ring member to engage the area of the neck 61 of the bottle 63 immediately below the crown cap 65. When this position is reached, surfaces 74 and 77 are in engagement and the upper extremity of movement is reached. This position is illustrated in FIG. 4.

Upon retraction of the elevating platform 16, the action of the spring 72 against the bottle 63 through the ring 66 causes the bottle 63 to move downwardly resulting in engagement of the lip of the resiliently-displaceable ring member under the crown cap 65 and lifting off of the cap as the bottle 63 moves further downwardly.

The action of the decapping element 42 occurs simultaneously with the other decapping elements 42 of the decapping unit 18.

The decanting unit 28 is shown typically in FIGS. 5 to 8 and includes a plurality of decanting members 78 mounted in any convenient manner on a mounting plate 80. A reciprocable rigid tube 82 is associated with each decanting member 78. Flexible tubes or lines 32 join each rigid tube 82 to the beer drain line 34.

As seen more clearly in FIGS. 6, 7 and 8, the decanting member 78 includes an outer hollow cylindrical element 84 closed at its upper end by a circular closure element 86, the latter being mounted to the plate 80. The hollow cylindrical element 84 is open at its lower end and an annular ring 88 having an inclined beer bottle shoulder-engaging surface 90 is attached to the element 84.

The tube 82 extends axially of the cylindrical element 84 and is mounted for reciprocal sliding movement in the closure element 86 and a cylindrical plug element 92.

The cylindrical plug element 92 is located in sliding relation to the inner wall 93 of the hollow cylindrical element 84 adjacent the lower end thereof and normally positioned in engagement with a sleeve 94 fixedly mounted in the element 84.

A disc element 96 having a central opening 98 through which the tube 82 passes is fixedly mounted to the inner wall 93 of the hollow cylindrical element 84 and spaced axially from the normal position of the plug element 92. A compression spring 100, engaging opposed surfaces 102 and 104 of the disc element 96 and the plug element 92, normally biases these elements apart and normally maintains the plug element 92 in engagement with the sleeve 94.

The plug element 92 may move upwardly against the action of the spring 100 until it engages the surface 102 of the disc element 96, as seen in FIG. 7.

A cup-like element 106 is mounted to the lower end of the plug element 92 in any convenient manner, for example, using the ball and socket arrangement illustrated. A skirt portion 108 of the cup-like element 106 has a diameter corresponding substantially to the diameter of the top 110 of the decapped bottle 112 from which beer is to be decanted.

A rubber sealing ring 114 is situated in the base 116 of the cup-like element 106 to provide a gas seal with the top 110 of the bottle 112 during use.

A further plug element 118 is fixedly mounted on the tube 82 and is situated in sliding relation to the inner wall 93 of the cylindrical element 84 for reciprocation with the tube 82. A compression spring 120 in engagement with opposed surfaces 122 and 124 of the plug element 118 and the disc element 96, respectively, normally biases the plug element 118 to its upper axial extremity of movement, namely, into engagement with the end closure 86, thereby defining the upper limit of movement of the tube 82.

The plug element 118 and the disc element 96 define a chamber 126 through which the plug element 118 may move against the action of the compression spring 120 to a position adjacent the disc element 96, as seen in FIG. 8, thereby defining the lower extremity of movement of the tube 82. Preferably, the chamber 126 is dimensioned so that the limits of movement of the tube 82 are in the manner illustrated, namely, an upper extremity where the tube 82 just projects through the cup member 106 and a lower extremity where the tube 82 extends into a beer bottle 112 to a location just above the bottom of the bottle.

An orifice 128 communicates with the chamber 126 and allows the introduction of compressed carbon dioxide, or other gas substantially inert to the beer from the source thereof (not shown) to the chamber 126 by line 30.

The tube 82 may be constructed of any suitable rigid material, such as stainless steel. The tube has a short portion of its length 130 extending axially downwardly from the lower extremity of the plug element which has a decreased outside diameter.

The length of the tube portion 130 should be sufficient at least to extend through a bearing ring 132 associated with the slidable plug element 92 and normally engaging the tube 82 to define a fluid flow passage 132 when the tube 82 has assumed the position shown in FIG. 8.

The decanting member 78 operates by first moving a beer bottle 112 upwardly substantially centrally into the orifice of the ring 88 under the action of the elevating platform 26 until the neck 110 of the bottle engages the sealing ring 114 in the cup member 106. Continued upward movement of the bottle 112 causes vertical movement of the plug 92 against the action of the spring 100 until the sloping surface 90 of the ring 88 engages the shoulder 113 of the bottle 112. The device has now assumed the position shown in FIG. 7.

The tube 82 now is lowered in any desired manner, for example, under the influence of compressed carbon dioxide, into the bottle 112 against the action of the spring 120 until the reduced outer-diameter portion 130 of the tube 82 establishes passageway 132 between chamber 126 and the interior of the bottle 112 and assumes the position shown in FIG. 8.

Compressed carbon dioxide is passed into the chamber 126 through opening 128 causing the beer to be displaced from the bottle through the tube 82 into the appropriate line 32. Once the bottle is empty, the compressed carbon dioxide feed is halted and the plug 118, and hence the tube 82, is allowed to retract under the influence of the spring 120 to the position shown in FIG. 7.

Thereafter, upon retraction of the elevating platform 26, the bottle 112 is removed and the plug 92 returns to the position shown in FIG. 6 under the influence of the spring 100. The operation of the decanting member 78 occurs simultaneously for all the members 78 of the decanting unit 28.

SUMMARY

The present invention, therefore, provides a beer bottle decapping and beer decanting apparatus which can handle any number of bottles simultaneously in their normal packaging structure and, additionally, avoids the formation of large and unmanageable quantities of foam and substantial exposure of the beer to air.

Modifications are possible within the scope of the invention.

I claim:

1. A bottle decapping and decanting apparatus comprising:
    conveying means to convey a case containing a plurality of capped beer-containing bottles to a decapping station,
    decapping means at said decapping station for removing simultaneously the caps from all said bottles in said case,
    conveying means for conveying said case containing decapped bottles from said decapping station to a decanting station,
    sensing means situated between said decapping and decanting stations for sensing the absence of caps on the bottles in said case,
    decanting means at said decanting station for displacing simultaneously the beer from all said decapped bottles and including tube means insertable into each of said bottles and conduit means capable of connecting a source of compressed gas substantially inert to beer with beer in each of said bottles for displacement of beer from said bottles through said tube means,
    conveying means for conveying said case containing decanted bottles away from said decanting station, and
    conduit means extending from said decanting means to a collection means for conveying decanted beer from said decanting station to said collection means, whereby the said bottles to be decapped and decanted are conveyed such that the bottles always remain upright during the conveying, decapping and decanting operations.

2. The apparatus of claim 1, wherein said decapping station includes said decapping means vertically displaced from a vertically reciprocable platform for reciprocating a beer case between a position in which said decapping means is inactive and a cap removing position.

3. The apparatus of claim 2, wherein said decapping station includes a plurality of decappping members corresponding in number to the number of bottles to be decapped, each of said decapping members including a decapping element mounted in substantially fixed position and a resiliently biased vertically-displaceable bottle engaging element.

4. The apparatus of claim 3, wherein each of said decapping members comprises a vertically extending rod fixedly mounted at the upper end thereof and having said decapping element attached to the lower end thereof, a cylindrical body member slidably mounted on said rod and constituting said bottle engaging element, said cylindrical body member including a collar portion slidably mounted on said rod, a first skirt portion encircling said decapping element, and depending downwardly from said collar portion and a second skirt portion extending upwardly from said collar portion and resilient means normally biasing said collar portion into engagement with said decapping element.

5. The apparatus of claim 4 wherein said resilient means includes a compression spring encircling said rod.

6. The apparatus of claim 5 including cylindrical means coaxially mounted in fixed position on said rod and telescoping with the internal wall of said second skirt portion, said compression spring engaging opposed faces of said collar portion and cylindrical means.

7. The apparatus of claim 4 wherein said decapping element comprises a cup member having a stepped inner wall defining first and second shoulders, first ring means mounted in fixed position in engagement with the one of said shoulders closest the mouth of said cup member and defining with the other of said shoulders an annular recess, and second ring means mounted in the recess, said second ring means having an outside diameter greater than the inside diameter of said first ring means and less than the diameter of the recess, said second ring means being resiliently biased against the peripheral wall of the recess and being diametrically movable in the recess.

8. The apparatus of claim 1 wherein said decanting station includes said decanting means vertically displaced from a vertically reciprocable platform for reciprocating a beer case between a position wherein said decanting means is inactive and a decanting position.

9. The apparatus of claim 8 wherein said decanting station includes a plurality of decanting members corresponding in number to the number of bottles from which beer is to be decanted, each of said decanting elements mounted in substantially fixed position and including one of said tube means.

10. The apparatus of claim 9, wherein each of said decanting elements comprises a hollow cylindrical body member having an inner wall and a fixedly mounted upper end closure and having said tube means extend substantially axially thereof through said end closure in slidable relationship thereto, disc means fixedly mounted on the inner wall of said body member and having a central opening through which said tube means passes, first plug means slidably mounted in engagement with said inner wall and normally biased to a first position downwardly remote from said disc means and movable to a second position adjacent said disc means, said first plug means supporting said tube means in sliding relation, bottle neck seal means associated with said first plug means, second plug means fixedly mounted on said tube means and slidable relative to said inner wall, said second plug means being biased to a first position upwardly remote from said disc means but adjacent said upper end closure and defining therewith a first chamber in fluid flow communication with said source of compressed gas substantially inert to the beer, said second plug means being movable to a second position adjacent said disc means wherein said tube means projects downwardly from said body member a distance corresponding substantially to the depth of said bottle, actuating means for moving said second plug member from said first to said second position thereof, and means defining a fluid flow path between said first chamber and said bottle neck seal means.

11. The apparatus of claim 10, wherein said first plug means is normally biased to its first position by a first compression spring surrounding said tube and engaging the opposed surfaces of said first plug means and said disc means.

12. The apparatus of claim 10, wherein said second plug means normally is biased to said first position by a second compression spring means surrounding said tube means and engaging opposed surfaces of said second plug means and said disc means.

13. The apparatus of claim 10 wherein said means defining a flow path includes a length of said tube of decreased outside diameter, said length of tube being located so that a flow path exists between said first chamber and said bottle seal means when said second plug means is in its second position.

14. The apparatus of claim 10 wherein said bottle neck seal means comprises cup means opening downwardly from said first plug means and having a diameter substantially that of a beer bottle neck from which beer is to be decanted, and including a sealing ring located in the cup means adjacent the join of the base and side wall thereof.

* * * * *